United States Patent
Mango, III

(10) Patent No.: US 6,224,801 B1
(45) Date of Patent: May 1, 2001

(54) METHOD OF MAKING A SPEAKER

(75) Inventor: Louis A. Mango, III, Trafalgar, IN (US)

(73) Assignee: Harman International Industries Incorporated, Northridge, CA (US)

(*) Notice: Subject to any disclaimer, the term of this patent is extended or adjusted under 35 U.S.C. 154(b) by 0 days.

(21) Appl. No.: 08/408,550

(22) Filed: Mar. 21, 1995

(51) Int. Cl.$^7$ ........................................... B29C 45/14
(52) U.S. Cl. ................... 264/154; 264/252; 264/265; 264/273; 264/274
(58) Field of Search ..................... 264/250, 252, 264/254, 255, 259, 275, 294, 154, 265, 273, 274

(56) References Cited

U.S. PATENT DOCUMENTS

| | | |
|---|---|---|
| 1,582,473 | 4/1926 | Kay et al. . |
| 1,872,583 | 8/1932 | Hawley . |
| 2,030,501 | 2/1936 | Cunningham . |
| 2,302,178 | 11/1942 | Brennan . |
| 2,646,853 | 7/1953 | Pocock . |
| 2,670,807 | 3/1954 | Brown . |
| 2,734,591 | 2/1956 | Olson et al. . |
| 2,840,177 | 6/1958 | Schoengold . |
| 3,612,783 | 10/1971 | Schneider . |
| 3,645,356 | 2/1972 | Sotome . |
| 3,684,052 | 8/1972 | Sotome . |
| 3,767,004 | 10/1973 | Liebscher . |
| 3,850,650 | 11/1974 | Von Bonin et al. . |
| 3,858,680 | 1/1975 | Tsuge et al. . |
| 3,862,376 | 1/1975 | White . |
| 3,961,378 | 6/1976 | White . |
| 3,997,023 | 12/1976 | White . |
| 4,014,737 | 3/1977 | Brennan . |
| 4,351,411 | 9/1982 | Inoue . |
| 4,646,874 | 3/1987 | Baitcher et al. . |
| 4,939,783 | 7/1990 | Dunning . |
| 5,220,863 | * 6/1993 | Scott et al. ........................... 264/262 |
| 5,319,718 | 6/1994 | Yocum . |

FOREIGN PATENT DOCUMENTS 55-74297  * 4/1980  (JP) .

* cited by examiner

Primary Examiner—Angela Ortiz
(74) Attorney, Agent, or Firm—Barnes & Thornburg

(57) ABSTRACT

A method of making a speaker comprises providing a pair of dies which define between them a cavity. A first portion of the cavity receives a diaphragm of the speaker. A second portion of the cavity adjacent an outer perimeter of the diaphragm receives a fluid thermoplastic elastomer for forming a diaphragm surround. The second portion includes a perimetrally inner first region adjacent the outer perimeter of the diaphragm for receiving the thermoplastic elastomer to form a perimetrally inner flange for bonding to the diaphragm adjacent the outer perimeter of the diaphragm. The second portion includes a central second region for receiving the thermoplastic elastomer to form a connecting arch of the surround. The second portion also includes a perimetrally outer third region for receiving the thermoplastic elastomer to form a perimetrally outer flange for attachment to a diaphragm support. A diaphragm is placed between the dies. The dies are closed. An amount of the fluid thermoplastic elastomer sufficient to fill the second portion is introduced into the cavity, and is permitted to solidify.

28 Claims, 2 Drawing Sheets

METHOD OF MAKING A SPEAKER

This invention relates to transducers and particularly to a method of making a loudspeaker and a loudspeaker made by the method. More particularly, the present invention relates to an improved technique for forming the surround and joining the diaphragm to the surround.

Loudspeakers incorporating molded components are known. There are, for example, the loudspeakers illustrated and described in U.S. Pat. Nos. 3,997,023 and 5,319,718. U.S. Pat. No. 3,997,023 employs an injection molded surround attached to the speaker frame and diaphragm by suitable adhesives. In U.S. Pat. No. 5,319,718, a conventional diaphragm is provided with a closed-cell polyurethane foam surround by placing the diaphragm in a mold, depositing uncured foamable urethane around the perimeter of the diaphragm, closing the mold and permitting the foamable urethane to foam and cure in a cavity formed by the mold around the perimeter of the diaphragm. The urethane impregnates the exposed outer peripheral edge of the diaphragm, bonding it to the diaphragm, and forms a closed cell outer skin as it cures.

According to one aspect of the invention, a method of making a speaker comprises providing a pair of dies which define between them a cavity. A first portion of the cavity is for receiving a diaphragm of the speaker. A second portion of the cavity adjacent an outer perimeter of the diaphragm when it is placed in the cavity receives a fluid thermoplastic elastomer for forming a diaphragm surround. The second portion includes a perimetrally inner first region adjacent the outer perimeter of the diaphragm for receiving the thermoplastic elastomer to form a perimetrally inner flange for bonding to the diaphragm adjacent the outer perimeter of the diaphragm when the fluid thermoplastic elastomer is introduced into the cavity. The second portion includes a central second region for receiving the thermoplastic elastomer to form a connecting arch of the surround when the fluid thermoplastic elastomer is introduced into the cavity. The second portion also includes a perimetrally outer third region for receiving the thermoplastic elastomer to form a perimetrally outer flange for attachment to a diaphragm support when the fluid thermoplastic elastomer is introduced into the cavity. A diaphragm is placed between the dies. The dies are closed. An amount of the fluid thermoplastic elastomer sufficient to fill the second portion is introduced into the cavity, and is permitted to solidify.

According to an illustrative embodiment of the invention, the step of providing a second portion including a perimetrally inner first region for receiving the fluid thermoplastic elastomer to form a perimetrally inner flange comprises providing a second portion including a perimetrally inner region for receiving the fluid thermoplastic elastomer to form a first perimetrally inner flange for bonding to a first side of the diaphragm adjacent the outer perimeter of the diaphragm and a second perimetrally inner flange for bonding to a second side of the diaphragm adjacent the outer perimeter of the diaphragm.

Further according to an illustrative embodiment, at least one first notch is formed in the outer perimeter of the diaphragm. The step of introducing into the cavity an amount of the fluid thermoplastic elastomer sufficient to fill the second portion includes introducing into the cavity an amount of the fluid thermoplastic elastomer sufficient to fill the at least one first notch.

According to another illustrative embodiment, at least one opening is formed through the diaphragm between first and second sides thereof adjacent but spaced from the outer perimeter thereof. The step of introducing into the cavity an amount of the fluid thermoplastic elastomer sufficient to fill the second portion includes introducing into the cavity an amount of the fluid thermoplastic elastomer sufficient to fill the at least one opening.

Additionally according to an illustrative embodiment, the step of providing a second portion including a perimetrally inner first region and a central second region comprises the step of providing at least one second notch extending between the perimetrally inner first region and the central second region. The step of introducing into the cavity an amount of the fluid thermoplastic elastomer sufficient to fill the second portion includes introducing into the cavity an amount of the fluid thermoplastic elastomer sufficient to fill the at least one second notch.

According to an illustrative embodiment, the step of providing a second portion including a central second region and a perimetrally outer third region comprises the step of providing at least one third notch extending between the central second region and the perimetrally outer third region. The step of introducing into the cavity an amount of the fluid thermoplastic elastomer sufficient to fill the second portion includes introducing into the cavity an amount of the fluid thermoplastic elastomer sufficient to fill the at least one third notch.

According to another aspect of the invention, a method of making a speaker comprises providing a pair of dies which define between them a cavity. A first portion of the cavity receives a diaphragm of the speaker. A second portion of the cavity adjacent an outer perimeter of the diaphragm when it is placed in the cavity receives a fluid thermoplastic elastomer for forming a diaphragm surround. The second portion includes a perimetrally inner first region adjacent the outer perimeter of the diaphragm for receiving the fluid thermoplastic elastomer to form a first perimetrally inner flange for bonding to a first side of the diaphragm adjacent the outer perimeter of the diaphragm and a second perimetrally inner flange for bonding to a second side of the diaphragm adjacent the outer perimeter of the diaphragm when the fluid thermoplastic elastomer is introduced into the cavity. The second portion further includes a central second region for receiving the fluid thermoplastic elastomer from a connecting arch of the surround when the fluid thermoplastic elastomer is introduced into the cavity. The second portion also includes a perimetrally outer third region for receiving the fluid thermoplastic elastomer to form a perimetrally outer flange for attachment to a diaphragm support when the fluid thermoplastic elastomer is introduced into the cavity. A diaphragm is placed between the dies. The dies are closed. An amount of the fluid thermoplastic elastomer sufficient to fill the second portion is introduced into the cavity. The thermoplastic elastomer is permitted to solidify.

According to another aspect of the invention, a method of making a speaker comprises providing a pair of dies which define between them a cavity. A first portion of the cavity receives a diaphragm of the speaker. A second portion of the cavity adjacent an outer perimeter of the diaphragm when it is placed in the cavity receives a moldable material for forming a diaphragm surround. The second portion includes a perimetrally inner first region adjacent the outer perimeter of the diaphragm for receiving the moldable material to form a perimetrally inner flange for bonding to the diaphragm adjacent the outer perimeter of the diaphragm when the moldable material is introduced into the cavity. The second portion further includes a central second region for receiving the moldable material to form a connecting arch of the surround when the moldable material is introduced into the cavity. The second portion also includes a perimetrally outer third region for receiving the moldable material to form a perimetrally outer flange for attachment to a diaphragm support when the moldable material is introduced into the cavity. A diaphragm is placed between the dies. The dies are closed. An amount of the moldable material sufficient to fill the second portion is introduced into the cavity. The moldable material is permitted to solidify. The step of providing a second portion including a perimetrally inner first region and a central second region comprises the step of providing at least one second notch extending between the perimetrally inner first region and the central second region. The step of introducing into the cavity an amount of the moldable material sufficient to fill the second portion includes introducing into the cavity an amount of the moldable material sufficient to fill the at least one second notch.

According to another aspect of the invention, a method of making a speaker comprises providing a pair of dies which define between them a cavity. A first portion of the cavity receives a diaphragm of the speaker. A second portion of the cavity adjacent an outer perimeter of the diaphragm when it is placed in the cavity receives a moldable material for forming a diaphragm surround. The second portion includes a perimetrally inner first region adjacent the outer perimeter of the diaphragm for receiving the moldable material to form a perimetrally inner flange for bonding to the diaphragm adjacent the outer perimeter of the diaphragm when the moldable material is introduced into the cavity. The second portion also includes a central second region for receiving the moldable material to form a connecting arch of the surround when the moldable material is introduced into the cavity. The second portion also includes a perimetrally outer third region for receiving the moldable material to form a perimetrally outer flange for attachment to a diaphragm support when the moldable material is introduced into the cavity. A diaphragm is placed between the dies. The dies are closed. An amount of the moldable material sufficient to fill the second portion is introduced into the cavity. The moldable material is permitted to solidify. The step of providing a second portion including a central second region and a perimetrally outer third region comprises the step of providing at least one third notch extending between the central second region and the perimetrally outer third region. The step of introducing into the cavity an amount of the moldable material sufficient to fill the second portion includes introducing into the cavity an amount of the moldable material sufficient to fill the at least one third notch.

According to another aspect of the invention, a method of making a speaker comprises providing a pair of dies which define between them a cavity. A first portion of the cavity receives a diaphragm of the speaker. A second portion of the cavity adjacent an outer perimeter of the diaphragm when it is placed in the cavity receives a moldable material for forming a diaphragm surround. The second portion includes a perimetrally inner first region adjacent the outer perimeter of the diaphragm for receiving the moldable material to form a perimetrally inner flange for bonding to the diaphragm adjacent the outer perimeter of the diaphragm when the moldable material is introduced into the cavity. The second portion includes a central second region for receiving the moldable material to form a connecting arch of the surround when the moldable material is introduced into the cavity. The second portion also includes a perimetrally outer third region for receiving the moldable material to form a perimetrally outer flange for attachment to a diaphragm support when the moldable material is introduced into the cavity. At least one first notch is formed in the outer perimeter of a diaphragm. The diaphragm is placed between the dies. The dies are closed. An amount of the moldable material sufficient to fill the second portion including the at least one first notch is introduced into the cavity. The moldable material is permitted to solidify.

According to another aspect of the invention, a method of making a speaker comprises providing a pair of dies which define between them a cavity. A first portion of the cavity receives a diaphragm of the speaker. A second portion of the cavity adjacent an outer perimeter of the diaphragm when it is placed in the cavity receives a moldable material for forming a diaphragm surround. The second portion includes a perimetrally inner first region adjacent the outer perimeter of the diaphragm for receiving the moldable material to form a perimetrally inner flange for bonding to the diaphragm adjacent the outer perimeter of the diaphragm when the moldable material is introduced into the cavity. The second portion includes a central second region for receiving the moldable material to form a connecting arch of the surround when the moldable material is introduced into the cavity. The second portion also includes a perimetrally outer third region for receiving the moldable material to form a perimetrally outer flange for attachment to a diaphragm support when the moldable material is introduced into the cavity. At least one opening is formed through the diaphragm between first and second sides thereof adjacent but spaced from the outer perimeter thereof. The diaphragm is placed between the dies. The dies are closed. An amount of the moldable material sufficient to fill the second portion including the at least one opening is introduced into the cavity. The moldable material is permitted to solidify.

According to illustrative embodiments of the invention, the moldable material comprises Sarlinks thermoplastic elastomer available from DSM Thermoplastic Elastomers, Inc., 690 Mechanic Street, Leominster, Mass. 01453-4451, Santoprene® thermoplastic elastomer available from Monsanto Company, St. Louis, Mo. or Kraton® thermoplastic elastomer available from Shell Oil Company, One Shell Plaza, Houston, Tex. 77252.

According to an illustrative embodiment of the invention, the perimeter of the diaphragm is overlapped on both its front and back surfaces by the thermoplastic elastomer during the molding process. The diaphragm is inserted into the mold, for example between the mold's dies. A cavity is defined between the mold's dies about the outer perimeter of the diaphragm on one or both sides of the diaphragm. The cavity provides for a thickness after curing of the elastomer of from about 0.010 inch (about 0.25 mm) to about 0.060 inch (about 1.5 mm) on the or each side of the diaphragm adjacent its outer perimeter. This, coupled with the use of thermoplastic elastomers of different durometers and the incorporation of stiffening elements, such as radially extending stiffening ribs, provides the necessary compliance or stiffness of the surround.

Further, according to an illustrative embodiment of the invention, the perimeter of the diaphragm can be notched or otherwise treated to enhance the bond between the diaphragm's outer perimeter and the thermoplastic elastomeric surround.

Of course, mold dies with appropriate gate, runner and shut-off design reduces the likelihood of misalignment of the diaphragm and surround due to shifting of the diaphragm during injection of the thermoplastic elastomer under relatively high pressure during molding of the surround. Further, molding of the surround to the diaphragm in the mold promotes the correct relative orientation of the diaphragm and surround, reducing the likelihood of certain alignment defects such as voice coil inside diameter-to-center pole misalignment. Finally, a thermoplastic elastomer can be chosen for the surround which is highly compatible with a particular frame powder coatings contemplated by the disclosure of U.S. Ser. No. 08/162,866 filed Dec. 3, 1993, titled Method of Manufacturing Speakers and Speakers Made by the Method, and assigned to the same assignee as this application.

The invention may best be understood by referring to the following detailed descriptions and accompanying drawings which illustrate the invention. In the drawings.

Figure 1:
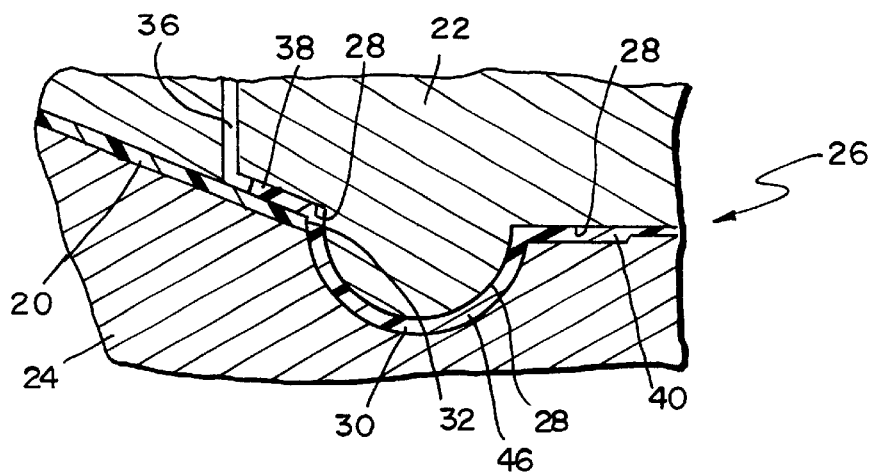
FIG. 1 illustrates an enlarged fragmentary sectional view of a portion of a mold wherein a speaker is being constructed according to an embodiment of the present invention.

The diaphragm 20 can be constructed from any of the various materials known in the art. For example, polypropylene, paper and paper composites made by slurry or "felting" processes or other processes, and formed or spun metal are all used as diaphragm materials. However formed, and from whatever materials, the diaphragm 20 is captured between the two dies 22, 24 of a mold 26. The mold 26 cavity is not completely filled by the diaphragm 20. Specifically, a cavity 28 for a surround 30 molded from an injection moldable thermoplastic elastomer remains around the outer perimeter 32 of the diaphragm 20 when the dies 22, 24 are closed together to capture the diaphragm 20 and position it securely between them. The cavity 28 is then filled with the injection moldable thermoplastic elastomer through one or more runners 36. The surround 30 includes an inner perimetral flange 38. The thermoplastic elastomers of the inner perimetral flange 38 to an extent impregnates or otherwise bonds to the diaphragm 20 adjacent its perimeter 32. The surround 30 also includes an outer perimetral flange 40 for bonding by any of the various known techniques to the speaker frame. The semicircular cross section web or arch 46 between the inner 38 and outer 40 flanges permits the diaphragm 20 to move in the magnetic field of the speaker in response to current flow in the speaker's voice coil.

Figure 2:
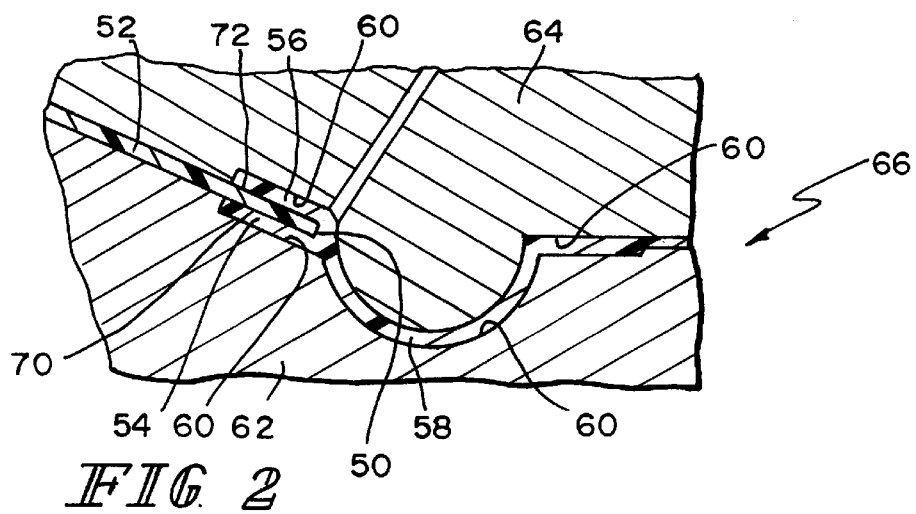
FIG. 2 illustrates an enlarged fragmentary sectional view of a portion of a mold wherein a speaker is being constructed according to another embodiment of the present invention.

In another embodiment of the speaker illustrated in FIG. 2, the outer perimetral edge 50 of the diaphragm 52 is captured between two inner perimetral flanges 54, 56 of the surround 58 from thermoplastic elastomer. The cavity 60 which permits the formation of the two inner perimetral flanges 54, 56 on the surround 58 is again formed in part by the outer perimeter 50 of the diaphragm 52 when the diaphragm 52 is inserted between the two dies 62, 64 and the mold 66 is then closed. When the thermoplastic elastomer is injected into the cavity 60, it flows around both sides 70, 72 of the outer perimeter 50 of the inserted diaphragm 52, forming the two flanges 54, 56. Again, the thermoplastic elastomer impregnates or otherwise bonds to the outer perimeter 50 of the diaphragm 52.

Figure 3:
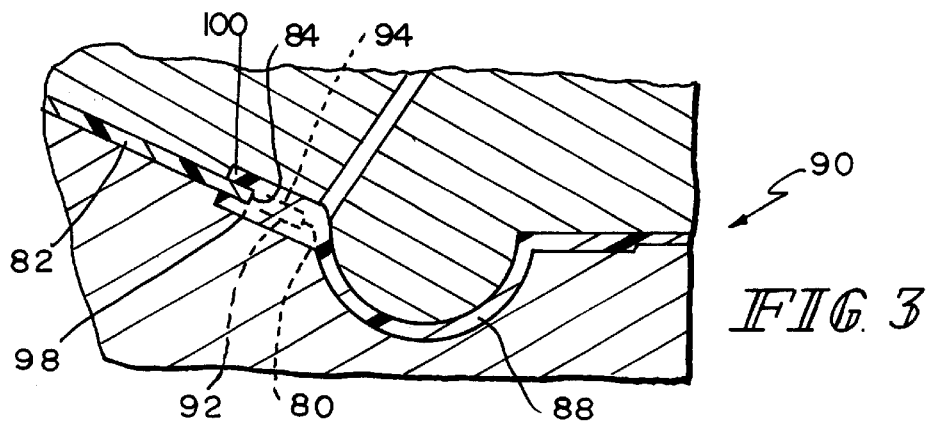
FIG. 3 illustrates an enlarged fragmentary sectional view of a portion of a mold wherein a speaker is being constructed according to another embodiment of the present invention.

In the embodiment of the speaker illustrated in FIG. 3, the outer perimeter 80 of the diaphragm 82 has been provided with perimetrally spaced, inwardly extending notches 84 to help fix the position of the injection molded surround 88 relative to the outer perimeter 80 of the diaphragm 82 and to help bond the surround 88 to the diaphragm 82. When the thermoplastic elastomer is injected into the mold 90, it flows around both sides 92, 94 of the perimeter 80 of the diaphragm 82 to form two flanges 98, 100 and fills the notches 84 in the perimeter 80 of the diaphragm 82 as well.

Figure 4:
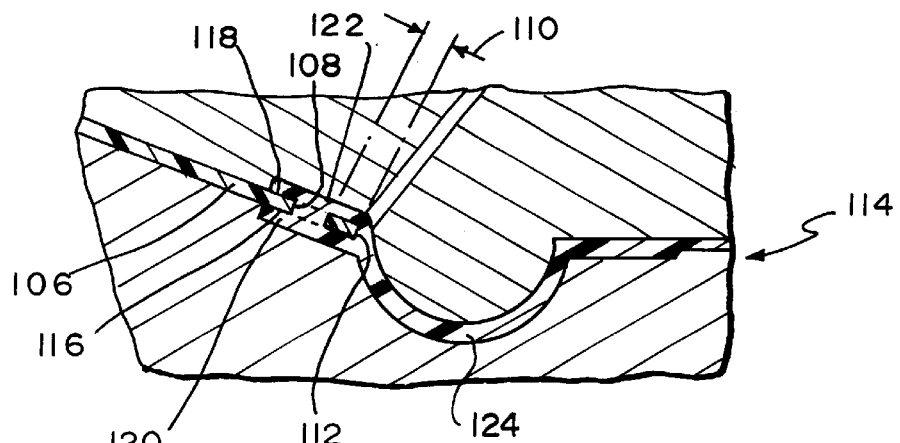
FIG. 4 illustrates an enlarged fragmentary sectional view of a portion of a mold wherein a speaker is being constructed according to another embodiment of the present invention.

In another embodiment of the speaker illustrated in FIG. 4, the diaphragm 106 is provided with holes 108 spaced a short distance 110 from its outer perimeter 112. In this embodiment, when the thermoplastic elastomer is injected into the mold 114, it flows around both sides 116, 118 of the perimeter 112 of the diaphragm 106 to form the two flanges 120, 122 and fills the holes 108 to fix the position of the injection molded surround 124 relative to the outer perimeter 112 of the diaphragm 106 and to bond the surround 124 to the diaphragm 106.

Figure 5:
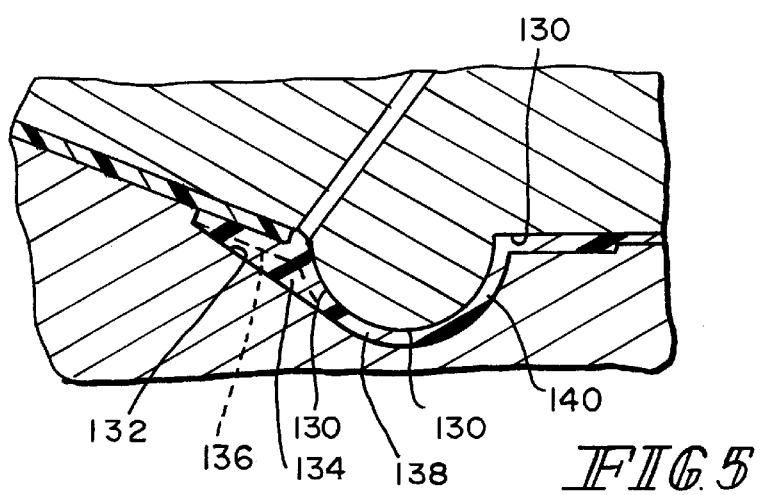
FIG. 5 illustrates an enlarged fragmentary sectional view of a portion of a mold wherein a speaker is being constructed according to another embodiment of the present invention; and, FIG. 6 illustrates an enlarged fragmentary sectional view of a portion of a mold wherein a speaker is being constructed according to another embodiment of the present invention.
Figure 6:
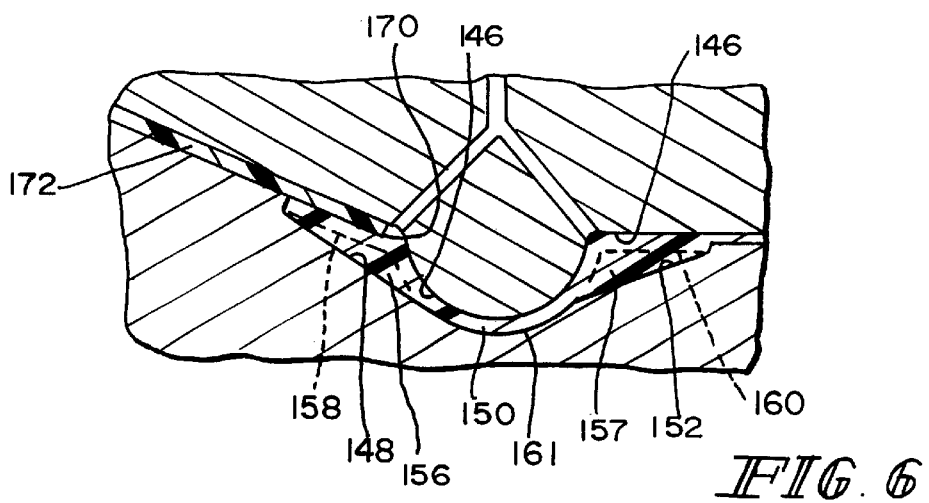

The injection molded surround provides additional design advantages which can best be understood by referring to FIGS. 5–6. In the embodiment of the speaker illustrated in FIG. 5, the mold cavity 130 is provided with perimetrally spaced inwardly extending notches 132. When the thermoplastic elastomer is injected into the cavity 130, these notches 132 fill with the thermoplastic elastomer to form ribs 134 which extend between the inner perimetral flange 136 and the arch 138 of the surround 140. These ribs 134 stiffen the surround 140 somewhat, making it slightly less compliant. This technique permits the speaker designer to tailor the characteristics of the speaker somewhat to the needs of a particular application.

In the embodiment of the invention illustrated in FIG. 6, the mold cavity 146 is provided with perimetrally spaced, inwardly extending notches 148 on one side of the arch 150 and perimetrally spaced, outwardly extending notches 152 on the other side of the arch 150. When the thermoplastic elastomer is injected into the cavity 146, these notches 148, 152 fill with the thermoplastic elastomer to form ribs 156, 157 which extend between the inner perimetral flange 158 and the arch 150 on one side, and between the outer perimetral flange 160 and the arch 150 on the other. Tailoring of the characteristics of the surround 161, and therefore of the speaker, can be achieved in this embodiment not only by the selection of the number, height and perimetral thickness of the inwardly and outwardly extending ribs 156, 157, respectively, but also by the relative placement of the inwardly extending ribs 156 and the outwardly extending ribs 157. For example, placement of the inwardly extending ribs 156 directly across the arch 150 from respective outwardly extending ribs 157 may result in a stiffer surround 161 than staggering the inwardly 156 and outwardly 157 extending ribs around the perimeter 170 of the diaphragm 172/surround 161.

What is claimed is:

1. A method of making a speaker comprising providing a pair of dies which define between them a cavity, providing in the cavity a first portion for receiving a diaphragm of the speaker, and, adjacent an outer perimeter of the diaphragm when it is placed in the cavity, a second portion for receiving a fluid thermoplastic elastomer for forming a diaphragm surround, the second portion including a perimetrally inner first region adjacent the outer perimeter of the diaphragm for receiving the thermoplastic elastomer to form a perimetrally inner flange for bonding to the diaphragm adjacent the outer perimeter of the diaphragm when the fluid thermoplastic elastomer is introduced into the cavity, a central second region for receiving the thermoplastic elastomer to form a connecting arch of the surround when the fluid thermoplastic elastomer is introduced into the cavity, and a perimetrally outer third region for receiving the thermoplastic elastomer to form a perimetrally outer flange for attachment to a diaphragm support when the fluid thermoplastic elastomer is introduced into the cavity, forming at least one first notch in the outer perimeter of a diaphragm, placing the diaphragm between the dies, closing the dies, introducing into the cavity an amount of the fluid thermoplastic elastomer sufficient to fill the second portion including the at least one first notch, and permitting the thermoplastic elastomer to solidify.

2. A method of making a speaker comprising providing a pair of dies which define between them a cavity, providing in the cavity a first portion for receiving a diaphragm of the speaker, and, adjacent an outer perimeter of the diaphragm when it is placed in the cavity, a second portion for receiving a fluid thermoplastic elastomer for forming a diaphragm surround, the second portion including a perimetrally inner first region adjacent the outer perimeter of the diaphragm for receiving the thermoplastic elastomer to form a perimetrally inner flange for bonding to the diaphragm adjacent the outer perimeter of the diaphragm when the fluid thermoplastic elastomer is introduced into the cavity, a central second region for receiving the thermoplastic elastomer to form a connecting arch of the surround when the fluid thermoplastic elastomer is introduced into the cavity, and a perimetrally outer third region for receiving the thermoplastic elastomer to form a perimetrally outer flange for attachment to a diaphragm support when the fluid thermoplastic elastomer is introduced into the cavity, forming at least one opening through a diaphragm between first and second sides thereof adjacent but spaced from the outer perimeter thereof, placing the diaphragm between the dies, closing the dies, introducing into the cavity an amount of the fluid thermoplastic elastomer sufficient to fill the second portion including the at least one opening, and permitting the thermoplastic elastomer to solidify.

3. A method of making a speaker comprising providing a pair of dies which define between them a cavity, providing in the cavity a first portion for receiving a diaphragm of the speaker, and, adjacent an outer perimeter of the diaphragm when it is placed in the cavity, a second portion for receiving a fluid thermoplastic elastomer for forming a diaphragm surround, the second portion including a perimetrally inner first region adjacent the outer perimeter of the diaphragm for receiving the thermoplastic elastomer to form a perimetrally inner flange for bonding to the diaphragm adjacent the outer perimeter of the diaphragm when the fluid thermoplastic elastomer is introduced into the cavity, a central second region for receiving the thermoplastic elastomer to form a connecting arch of the surround when the fluid thermoplastic elastomer is introduced into the cavity, and a perimetrally outer third region for receiving the thermoplastic elastomer to form a perimetrally outer flange for attachment to a diaphragm support when the fluid thermoplastic elastomer is introduced into the cavity, placing a diaphragm between the dies, closing the dies, introducing into the cavity an amount of the fluid thermoplastic elastomer sufficient to fill the second portion, and permitting the thermoplastic elastomer to solidify, the step of providing a second portion including a perimetrally inner first region and a central second region comprising the step of providing at least one second notch extending between the perimetrally inner first region and the central second region, the step of introducing into the cavity an amount of the fluid thermoplastic elastomer sufficient to fill the second portion including introducing into the cavity an amount of the fluid thermoplastic elastomer sufficient to fill the at least one second notch.

4. The method of claim 3 wherein the step of providing a second portion including a central second region and a perimetrally outer third region comprises the step of providing at least one third notch extending between the central second region and the perimetrally outer third region, the step of introducing into the cavity an amount of the fluid thermoplastic elastomer sufficient to fill the second portion including introducing into the cavity an amount of the fluid thermoplastic elastomer sufficient to fill the at least one third notch.

5. A method of making a speaker comprising providing a pair of dies which define between them a cavity, providing in the cavity a first portion for receiving a diaphragm of the speaker, and, adjacent an outer perimeter of the diaphragm when it is placed in the cavity, a second portion for receiving a fluid thermoplastic elastomer for forming a diaphragm surround, the second portion including a perimetrally inner first region adjacent the outer perimeter of the diaphragm for receiving the thermoplastic elastomer to form a perimetrally inner flange for bonding to the diaphragm adjacent the outer perimeter of the diaphragm when the fluid thermoplastic elastomer is introduced into the cavity, a central second region for receiving the thermoplastic elastomer to form a connecting arch of the surround when the fluid thermoplastic elastomer is introduced into the cavity, and a perimetrally outer third region for receiving the thermoplastic elastomer to form a perimetrally outer flange for attachment to a diaphragm support when the fluid thermoplastic elastomer is introduced into the cavity, placing a diaphragm between the dies, closing the dies, introducing into the cavity an amount of the fluid thermoplastic elastomer sufficient to fill the second portion, and permitting the thermoplastic elastomer to solidify, the step of providing a second portion including a central second region and a perimetrally outer third region comprising the step of providing at least one third notch extending between the central second region and the perimetrally outer third region, the step of introducing into the cavity an amount of the fluid thermoplastic elastomer sufficient to fill the second portion including introducing into the cavity an amount of the fluid thermoplastic elastomer sufficient to fill the at least one third notch.

6. The method of claim 1, 2, 3 or 5 wherein providing a second portion including a perimetrally inner first region for receiving the fluid thermoplastic elastomer to form a perimetrally inner flange for bonding to the diaphragm adjacent the outer perimeter of the diaphragm comprises providing a second portion including a perimetrally inner region for receiving the fluid thermoplastic elastomer to form a first perimetrally inner flange for bonding to a first side of the diaphragm adjacent the outer perimeter of the diaphragm and a second perimetrally inner flange for bonding to a second side of the diaphragm adjacent the outer perimeter of the diaphragm.

7. A method of making a speaker comprising providing a pair of dies which define between them a cavity, providing in the cavity a first portion for receiving a diaphragm of the speaker, and, adjacent an outer perimeter of the diaphragm when it is placed in the cavity, a second portion for receiving a fluid thermoplastic elastomer for forming a diaphragm surround, the second portion including a perimetrally inner first region adjacent the outer perimeter of the diaphragm for receiving the fluid thermoplastic elastomer to form a first perimetrally inner flange for bonding to a first side of the diaphragm adjacent the outer perimeter of the diaphragm and a second perimetrally inner flange for bonding to a second side of the diaphragm adjacent the outer perimeter of the diaphragm when the fluid thermoplastic elastomer is introduced into the cavity, a central second region for receiving the fluid thermoplastic elastomer to form a connecting arch of the surround when the fluid thermoplastic elastomer is introduced into the cavity, and a perimetrally outer third region for receiving the fluid thermoplastic elastomer to form a perimetrally outer flange for attachment to a diaphragm support when the fluid thermoplastic elastomer is introduced into the cavity, forming at least one first notch in the outer perimeter of a diaphragm, placing the diaphragm between the dies, closing the dies introducing into the cavity an amount of the fluid thermoplastic elastomer sufficient to fill the second portion including the at least one first notch, and permitting the thermoplastic elastomer to solidify.

8. A method of making a speaker comprising providing a pair of dies which define between them a cavity, providing in the cavity a first portion for receiving a diaphragm of the speaker, and, adjacent an outer perimeter of the diaphragm when it is placed in the cavity, a second portion for receiving a fluid thermoplastic elastomer for forming a diaphragm surround, the second portion including a perimetrally inner first region adjacent the outer perimeter of the diaphragm for receiving the fluid thermoplastic elastomer to form a first perimetrally inner flange for bonding to a first side of the diaphragm adjacent the outer perimeter of the diaphragm and a second perimetrally inner flange for bonding to a second side of the diaphragm adjacent the outer perimeter of the diaphragm when the fluid thermoplastic elastomer is introduced into the cavity, a central second region for receiving the fluid thermoplastic elastomer to form a connecting arch of the surround when the fluid thermoplastic elastomer is introduced into the cavity, and a perimetrally outer third region for receiving the fluid thermoplastic elastomer to form a perimetrally outer flange for attachment to a diaphragm support when the fluid thermoplastic elastomer is introduced into the cavity, forming at least one opening through the diaphragm between first and second sides thereof adjacent but spaced from the outer perimeter thereof, placing the diaphragm between the dies, closing the dies, introducing into the cavity an amount of the fluid thermoplastic elastomer sufficient to fill the second portion including the at least one opening, and permitting the thermoplastic elastomer to solidify.

9. The method of claim 7 or 8 wherein the step of providing a second portion including a perimetrally inner first region and a central second region comprises the step of providing at least one second notch extending between the perimetrally inner first region and the central second region, the step of introducing into the cavity an amount of the fluid thermoplastic elastomer sufficient to fill the second portion including introducing into the cavity an amount of the fluid thermoplastic elastomer sufficient to fill the at least one second notch.

10. The method of claim 9 wherein the step of providing a second portion including a central second region and a perimetrally outer third region comprises the step of providing at least one third notch extending between the central second region and the perimetrally outer third region, the step of introducing into the cavity an amount of the fluid thermoplastic elastomer sufficient to fill the second portion including introducing into the cavity an amount of the fluid thermoplastic elastomer sufficient to fill the at least one third notch.

11. The method of claim 7 or 8 wherein the step of providing a second portion including a central second region and a perimetrally outer third region comprises the step of providing at least one third notch extending between the central second region and the perimetrally outer third region, the step of introducing into the cavity an amount of the fluid thermoplastic elastomer sufficient to fill the second portion including introducing into the cavity an amount of the fluid thermoplastic elastomer sufficient to fill the at least one third notch.

12. A method of making a speaker comprising providing a pair of dies which define between them a cavity, providing in the cavity a first portion for receiving a diaphragm of the speaker, and, adjacent an outer perimeter of the diaphragm when it is placed in the cavity, a second portion for receiving a moldable material for forming a diaphragm surround, the second portion including a perimetrally inner first region adjacent the outer perimeter of the diaphragm for receiving the moldable material to form a perimetrally inner flange for bonding to the diaphragm adjacent the outer perimeter of the diaphragm when the moldable material is introduced into the cavity, a central second region for receiving the moldable material to form a connecting arch of the surround when the moldable material is introduced into the cavity, and a perimetrally outer third region for receiving the moldable material to form a perimetrally outer flange for attachment to a diaphragm support when the moldable material is introduced into the cavity, placing a diaphragm between the dies, closing the dies, introducing into the cavity an amount of the moldable material sufficient to fill the second portion, and permitting the moldable material to solidify, the step of providing a second portion including a perimetrally inner first region and a central second region comprising the step of providing at least one second notch extending between the perimetrally inner first region and the central second region, the step of introducing into the cavity an amount of the moldable material sufficient to fill the second portion including introducing into the cavity an amount of the moldable material sufficient to fill the at least one second notch.

13. The method of claim 12 wherein the step of providing a second portion including a central second region and a perimetrally outer third region comprises the step of providing at least one third notch extending between the central second region and the perimetrally outer third region, the step of introducing into the cavity an amount of the moldable material sufficient to fill the second portion including introducing into the cavity an amount of the moldable material sufficient to fill the at least one third notch.

14. The method of claim 12 wherein providing a second portion including a perimetrally inner first region for receiving the moldable material to form a perimetrally inner flange for bonding to the diaphragm adjacent the outer perimeter of the diaphragm comprises providing a second portion including a perimetrally inner region for receiving the moldable material to form a first perimetrally inner flange for bonding to a first side of the diaphragm adjacent the outer perimeter of the diaphragm and a second perimetrally inner flange for bonding to a second side of the diaphragm adjacent the outer perimeter of the diaphragm.

15. The method of claim 12, 13 or 14 and further comprising the step of forming at least one first notch in the outer perimeter of the diaphragm, the step of introducing into the cavity an amount of the moldable material sufficient to fill the second portion including introducing into the cavity an amount of the moldable material sufficient to fill the at least one first notch.

16. The method of claim 12, 13 or 14 and further comprising the step of forming at least one opening through the diaphragm between first and second sides thereof adjacent but spaced from the outer perimeter thereof, the step of introducing into the cavity an amount of the moldable material sufficient to fill the second portion including introducing into the cavity an amount of the moldable material sufficient to fill the at least one opening.

17. A method of making a speaker comprising providing a pair of dies which define between them a cavity, providing in the cavity a first portion for receiving a diaphragm of the speaker, and, adjacent an outer perimeter of the diaphragm when it is placed in the cavity, a second portion for receiving a moldable material for forming a diaphragm surround, the second portion including a perimetrally inner first region adjacent the outer perimeter of the diaphragm for receiving the moldable material to form a perimetrally inner flange for bonding to the diaphragm adjacent the outer perimeter of the diaphragm when the moldable material is introduced into the cavity, a central second region for receiving the moldable material to form a connecting arch of the surround when the moldable material is introduced into the cavity, and a perimetrally outer third region for receiving the moldable material to form a perimetrally outer flange for attachment to a diaphragm support when the moldable material is introduced into the cavity, placing a diaphragm between the dies, closing the dies, introducing into the cavity an amount of the moldable material sufficient to fill the second portion, and permitting the moldable material to solidify, the step of providing a second portion including a central second region and a perimetrally outer third region comprising the step of providing at least one third notch extending between the central second region and the perimetrally outer third region, the step of introducing into the cavity an amount of the moldable material sufficient to fill the second portion including introducing into the cavity an amount of the moldable material sufficient to fill the at least one third notch.

18. The method of claim 17 wherein providing a second portion including a perimetrally inner first region for receiving the moldable material to form a perimetrally inner flange for bonding to the diaphragm adjacent the outer perimeter of the diaphragm comprises providing a second portion including a perimetrally inner region for receiving the moldable material to form a first perimetrally inner flange for bonding to a first side of the diaphragm adjacent the outer perimeter of the diaphragm and a second perimetrally inner flange for bonding to a second side of the diaphragm adjacent the outer perimeter of the diaphragm.

19. The method of claim 17 or 18 and further comprising the step of forming at least one first notch in the outer perimeter of the diaphragm, the step of introducing into the cavity an amount of the moldable material sufficient to fill the second portion including introducing into the cavity an amount of the moldable material sufficient to fill the at least one first notch.

20. The method of claim 17 or 18 and further comprising the step of forming at least one opening through the diaphragm between first and second sides thereof adjacent but spaced from the outer perimeter thereof, the step of introducing into the cavity an amount of the moldable material sufficient to fill the second portion including introducing into the cavity an amount of the moldable material sufficient to fill the at least one opening.

21. A method of making a speaker comprising providing a pair of dies which define between them a cavity, providing in the cavity a first portion for receiving a diaphragm of the speaker, and, adjacent an outer perimeter of the diaphragm when it is placed in the cavity, a second portion for receiving a moldable material for forming a diaphragm surround, the second portion including a perimetrally inner first region adjacent the outer perimeter of the diaphragm for receiving the moldable material to form a perimetrally inner flange for bonding to the diaphragm adjacent the outer perimeter of the diaphragm when the moldable material is introduced into the cavity, a central second region for receiving the moldable material to form a connecting arch of the surround when the moldable material is introduced into the cavity, and a perimetrally outer third region for receiving the moldable material to form a perimetrally outer flange for attachment to a diaphragm support when the moldable material is introduced into the cavity, forming at least one first notch in the outer perimeter of a diaphragm, placing the diaphragm between the dies, closing the dies, introducing into the cavity an amount of the moldable material sufficient to fill the second portion including the at least one first notch, and permitting the moldable material to solidify.

22. The method of claim 21 wherein the step of providing a second portion including a perimetrally inner first region and a central second region comprises the step of providing at least one second notch extending between the perimetrally inner first region and the central second region, the step of introducing into the cavity an amount of the moldable material sufficient to fill the second portion including introducing into the cavity an amount of the moldable material sufficient to fill the at least one second notch.

23. The method of claim 22 wherein the step of providing a second portion including a central second region and a perimetrally outer third region comprises the step of providing at least one third notch extending between the central second region and the perimetrally outer third region, the step of introducing into the cavity an amount of the moldable material sufficient to fill the second portion including introducing into the cavity an amount of the moldable material sufficient to fill the at least one third notch.

24. The method of claim 21 wherein the step of providing a second portion including a central second region and a perimetrally outer third region comprises the step of providing at least one third notch extending between the central second region and the perimetrally outer third region, the step of introducing into the cavity an amount of the moldable material sufficient to fill the second portion including introducing into the cavity an amount of the moldable material sufficient to fill the at least one third notch.

25. A method of making a speaker comprising providing a pair of dies which define between them a cavity, providing in the cavity a first portion for receiving a diaphragm of the speaker, and, adjacent an outer perimeter of the diaphragm when it is placed in the cavity, a second portion for receiving a moldable material for forming a diaphragm surround, the second portion including a perimetrally inner first region adjacent the outer perimeter of the diaphragm for receiving the moldable material to form a perimetrally inner flange for bonding to the diaphragm adjacent the outer perimeter of the diaphragm when the moldable material is introduced into the cavity, a central second region for receiving the moldable material to form a connecting arch of the surround when the moldable material is introduced into the cavity, and a perimetrally outer third region for receiving the moldable material to form a perimetrally outer flange for attachment to a diaphragm support when the moldable material is introduced into the cavity, forming at least one opening through the diaphragm between first and second sides thereof adjacent but spaced from the outer perimeter thereof, placing the diaphragm between the dies, closing the dies, introducing into the cavity including the at least one opening an amount of the moldable material sufficient to fill the second portion, and permitting the moldable material to solidify.

26. The method of claim 25 wherein the step of providing a second portion including a perimetrally inner first region and a central second region comprises the step of providing at least one second notch extending between the perimetrally inner first region and the central second region, the step of introducing into the cavity an amount of the moldable material sufficient to fill the second portion including introducing into the cavity an amount of the moldable material sufficient to fill the at least one second notch.

27. The method of claim 26 wherein the step of providing a second portion including a central second region and a perimetrally outer third region comprises the step of providing at least one third notch extending between the central second region and the perimetrally outer third region, the step of introducing into the cavity an amount of the moldable material sufficient to fill the second portion including introducing into the cavity an amount of the moldable material sufficient to fill the at least one third notch.

28. The method of claim 25 wherein the step of providing a second portion including a central second region and a perimetrally outer third region comprises the step of providing at least one third notch extending between the central second region and the perimetrally outer third region, the step of introducing into the cavity an amount of the moldable material sufficient to fill the second portion including introducing into the cavity an amount of the moldable material sufficient to fill the at least one third notch.

* * * * *